(12) United States Patent
Wiest et al.

(10) Patent No.: US 10,746,581 B2
(45) Date of Patent: Aug. 18, 2020

(54) FIELD DEVICE WITH COMPENSATION CIRCUIT FOR ELIMINATING ENVIRONMENTAL INFLUENCES

(71) Applicant: Endress + Hauser Flowtec AG, Reinach (CH)

(72) Inventors: Achim Wiest, Weil am Rhein (DE); Oliver Brumberg, Rheinfelden (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 337 days.

(21) Appl. No.: 15/579,985

(22) PCT Filed: Jun. 14, 2016

(86) PCT No.: PCT/EP2016/063539
§ 371 (c)(1),
(2) Date: Dec. 6, 2017

(87) PCT Pub. No.: WO2016/207015
PCT Pub. Date: Dec. 29, 2016

(65) Prior Publication Data
US 2018/0149506 A1 May 31, 2018

(30) Foreign Application Priority Data
Jun. 23, 2015 (DE) .................. 10 2015 110 050

(51) Int. Cl.
*G01F 1/66* (2006.01)
*G01D 3/036* (2006.01)
(Continued)

(52) U.S. Cl.
CPC .......... *G01F 1/667* (2013.01); *G01D 3/0365* (2013.01); *G01F 1/66* (2013.01); *G01F 1/663* (2013.01);
(Continued)

(58) Field of Classification Search
None
See application file for complete search history.

(56) References Cited

U.S. PATENT DOCUMENTS

| 4,176,556 A | 12/1979 | Takenaka |
| 4,503,707 A | 3/1985 | Rosa et al. |

(Continued)

FOREIGN PATENT DOCUMENTS

| CN | 1130435 A | 9/1996 |
| CN | 1196811 A | 10/1998 |

(Continued)

OTHER PUBLICATIONS

Faisal R. Badal in A survey on control issues in renewable energy integration and microgrid, 27 pages (Year: 2019).*
(Continued)

*Primary Examiner* — Tung S Lau
(74) *Attorney, Agent, or Firm* — Bacon & Thomas, PLLC

(57) ABSTRACT

An apparatus for monitoring at least one physical or chemical process variable, comprising at least one measurement branch and a compensation branch connected in parallel therewith for compensating the influence of at least one environmental parameter on the process variable and/or on the measuring of the process variable. The measurement branch includes at least one primary sensor unit and a primary electronics unit for signal registration, evaluation, and/or feeding. The compensation branch includes at least a secondary sensor unit and a secondary electronics unit. The secondary sensor unit is so embodied that it registers a physical or chemical variable characteristic for the at least one environmental parameter, wherein the secondary electronics unit is so embodied that it draws the required energy from the measurement branch, and that it produces from the characteristic physical or chemical variable a compensation (Continued)

signal, which it transmits to the primary electronics unit of the measuring branch.

18 Claims, 7 Drawing Sheets

(51) Int. Cl.
 *G01F 15/02* (2006.01)
 *G01F 23/00* (2006.01)
(52) U.S. Cl.
 CPC ............ *G01F 1/668* (2013.01); *G01F 15/022* (2013.01); *G01F 23/0076* (2013.01)

(56) References Cited

U.S. PATENT DOCUMENTS

| | | | | |
|---|---|---|---|---|
| 5,345,161 | A * | 9/1994 | Zieve | B21J 15/24 307/110 |
| 2001/0023190 | A1 * | 9/2001 | Kim | H04W 52/52 455/522 |
| 2005/0001487 | A1 * | 1/2005 | Ausserlechner | G01D 3/0365 307/100 |
| 2005/0146782 | A1 * | 7/2005 | Takeyama | H01S 3/06754 359/337.1 |
| 2009/0013798 | A1 * | 1/2009 | Hockey | G01F 1/36 73/861.03 |
| 2009/0030634 | A1 | 1/2009 | Schumacher | |
| 2009/0080290 | A1 * | 3/2009 | Ray | G01V 1/00 367/51 |
| 2010/0128778 | A1 * | 5/2010 | Ji | H04N 19/61 375/240.2 |
| 2014/0136727 | A1 * | 5/2014 | Lim | H04L 65/4084 709/231 |
| 2015/0316400 | A1 * | 11/2015 | Wiest | G01F 1/66 73/861.28 |
| 2016/0159125 | A1 * | 6/2016 | Leskanic | B41M 5/38221 347/110 |

FOREIGN PATENT DOCUMENTS

| | | | | |
|---|---|---|---|---|
| CN | 1339103 | A | 3/2002 | |
| CN | 2618151 | Y | 5/2004 | |
| CN | 101939708 | A | 1/2011 | |
| CN | 103376755 | A | 10/2013 | |
| CN | 104136891 | A | 11/2014 | |
| DE | 28 22 276 | A1 | 1/1979 | |
| DE | 3411306 | A1 | 10/1984 | |
| DE | 10200405388 | * | 5/2005 | ............. G01D 3/036 |
| DE | 10 2004 053 884 | A1 | 5/2006 | |
| DE | 102004053884 | A1 | 5/2006 | |
| DE | 10 2007 024 006 | A1 | 11/2008 | |
| DE | 10 2007 030 700 | A1 | 5/2009 | |
| DE | 10 2010 029 119 | A1 | 11/2011 | |
| DE | 10 2013 100 670 | A1 | 7/2014 | |
| WO | 2009/003963 | A2 | 1/2009 | |

OTHER PUBLICATIONS

German Search Report, German PTO, Munich, dated Mar. 17, 2016.
International Search Report, EPO, The Netherlands, dated Sep. 28, 2016.
Office Action dated Oct. 29, 2019 in corresponding Chinese application No. 201680036456.0.

* cited by examiner

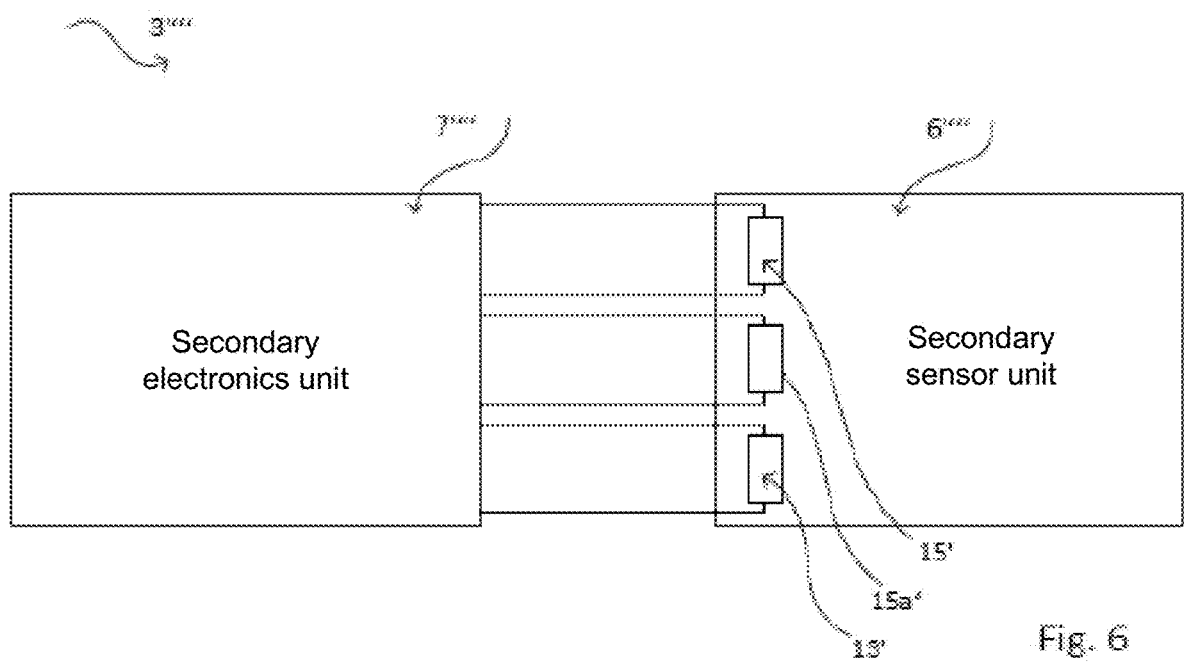

FIELD DEVICE WITH COMPENSATION CIRCUIT FOR ELIMINATING ENVIRONMENTAL INFLUENCES

TECHNICAL FIELD

The invention relates to an apparatus for monitoring at least one physical or chemical process variable, comprising at least one measurement branch and a compensation branch connected in parallel therewith. The measurement branch serves, in such case, for registering the at least one process variable, and the compensation branch for compensating the influence of at least one environmental parameter on the process variable and/or on the measuring of the process variable.

BACKGROUND DISCUSSION

The process variable is, for example, the flow rate of a fluid flowing through a measuring tube or pipe or the fill level of a medium in a container. However, also other process variables fall within the scope of the invention, such as, for example, the viscosity or the density of the medium. A wide variety of corresponding field devices are produced and sold by the company, Endress+Hauser.

The registering of the process variable of interest can be influenced by the most varied of parameters of the environment, which negatively influence the measurement result. An example is given by the influence of temperature, more exactly the temperature of the medium, or, in given cases, also the ambient temperature. Temperature plays a large role in many different field devices, and, thus, the most varied of measures are known for compensating its influence on the registering of a process variable by means of a field device. These measures are as varied as the different measuring principles.

For example, described in German patent, DE102010030791A1 is a circuit for compensating the influence of temperature in the case of a vibronic fill-level measuring device. The underpinning measuring principle is known from a large number of publications. An oscillatable unit is excited to execute mechanical oscillations by means of an electromechanical transducer unit driven by an electrical exciter signal. For eliminating the influence of temperature on the measuring, the electromechanical transducer unit is connected in parallel with a reference element, which is likewise supplied with the exciter signal. By means of an algorithm, the oscillation independent reference signal obtained with the reference element is taken into consideration with the measurement signal, so that the influence of temperature can be compensated.

A temperature compensation circuit is likewise often discussed in connection with ultrasonic, flow measuring devices. Also for this category of field devices, the underpinning measuring principles are known from a large number of publications. In the case of the travel-time difference principle, the different travel times of ultrasonic pulses in, and counter to, the flow direction of the medium are evaluated, while in the case of the Doppler principle an ultrasonic pulse of adjustable frequency is coupled into the medium and the reflected signal detected.

For eliminating the influence of temperature in the case of a piezooscillator, the German Patent, DE19820208A1 describes the provision of a temperature dependent component in the form of a temperature dependent resistance connected in parallel. In such case, both the flow rate and the temperature are transmitted via the same signal line. Therefore, disadvantageously in the case of such a circuit arrangement, the temperature measurement can be negatively influenced by an additional warming of the temperature dependent resistance.

In German Patent, DE10057188B4, an energetic decoupling of the temperature sensor from the ultrasonic signal emitter can be achieved by the provision of a coil. However, in the case of a coil, as a result of self-warming, fluctuations of resistance and/or inductance can occur, which likewise have a negative influence on the determining of temperature.

German Patent, DE102013100670A1 discloses an ultrasonic, flow measuring device with a temperature compensation, which is performed by a temperature sensor connected in parallel with a piezoelement. The temperature sensor includes a temperature dependent measuring element, a limiting resistor for power limiting and/or a limiting circuit, and the temperature is determined in measuring pauses of the ultrasound flow measurement and/or during the transmitting of an ultrasonic transducer in the measurement circuit.

In the case of all these compensation circuits for ultrasonic, flow measuring devices, the measurement signals for flow measurement and for temperature compensation are transmitted via the same line. Furthermore, it is necessary that within an electronics unit, in which the measurement signals are processed as well as the flow rate determined, there be a switching between a module for the flow measurement and an additional module for the temperature measurement. This is, on the one hand, a comparatively complex solution, and, on the other hand, it cannot be prevented that in the course of the signal transmission by means of the same line a mutual influencing of the temperature- and flow measurements occurs.

Besides the temperature, parameters of the environment can include, for example, also the expansion of a tube, or pipe, wall as a result of pressure of a flowing medium. Known in the state of the art for this influence are approaches similar to those used for ultrasonic, flow measuring devices, in order to determine the influence on the measuring of the flow, which approaches have correspondingly also similar disadvantages.

It would, however, be desirable, to determine a parameter of the environment for a measured variable in such a manner that the determination is not influenced by the actual measuring.

SUMMARY OF THE INVENTION

An object of the present invention is to provide an apparatus for monitoring at least one physical or chemical process variable with an adaptive compensation branch for compensating the influence of at least one environmental parameter on the particular process variable or its measuring, wherein the determining of the process variable and the determining of the compensation variable do not influence one another.

The object is achieved according to the invention by an apparatus for monitoring at least one physical or chemical process variable, comprising at least one measurement branch and a compensation branch connected in parallel therewith for compensating the influence of at least one environmental parameter on the process variable and/or on the measuring of the process variable, wherein the measurement branch includes at least a primary sensor unit and a primary electronics unit for signal registration, evaluation, and/or feeding, wherein the compensation branch includes at least a secondary sensor unit and a secondary electronics unit, wherein the secondary sensor unit is so embodied that it registers a physical or chemical variable characteristic for the at least one environmental parameter, wherein the secondary electronics unit is so embodied that it draws the required energy from the measurement branch and that it produces from the characteristic physical or chemical variable a compensation signal, which it transmits to the primary electronics unit of the measuring branch.

According to the invention, thus the measurement branch and the compensation branch are energetically decoupled. The decoupling concerns, in such case, the producing of the compensation signal. The secondary electronics unit draws the required energy from the measurement branch, supplies the secondary sensor unit, and processes the characteristic physical or chemical variable registered by means of the secondary sensor unit. By means of the secondary electronics unit and the secondary sensor unit, the compensation variable can thus be ascertained and conditioned locally and in the compensation branch, so that the two measurements do not negatively influence one another. Advantageously, furthermore, no supplementary components are needed within the primary electronics unit for provision of the compensation variable measurement, such as, for example, switches for switching between a mode for measuring the process variable and a second mode for measuring the compensation variable.

Which environmental parameter needs to be compensated depends, in such case, strongly on the particular application. Of concern, in such case, can be the temperature, however, also the expansion of a tube, or pipe, wall due to pressure of a flowing medium, or, for example, the humidity. Independently of the particular environmental parameter, an apparatus of the invention can be applied, in which a suitable secondary sensor unit is selected, which is suitable for registering a characteristic physical or chemical variable having a mathematical, chemical or physical relationship with the environmental parameter. From this variable, then a compensation signal, especially an electrical compensation signal, can be produced, which is transmitted to the measurement branch.

In a preferred embodiment, the primary sensor unit is supplied with a clocked signal, wherein the secondary electronics unit is so embodied that it transmits the compensation signal to the primary electronics unit during the transmission pauses or receipt pauses. This is the simplest way to transmit the compensation variable to the primary electronics unit. The compensation variable can, however, also be superimposed and/or modulated onto the measurement signal.

In another embodiment, the primary and secondary electronics unit are each equipped with a radio module or optical transmission module, wherein the compensation signal is transmitted to the primary electronics unit by means of the radio module or optical transmission module.

An especially preferred embodiment includes that the parameter of the environment to be compensated is temperature. In such case, it is advantageous to provide at least one resistor, especially a temperature dependent resistor, for registering the temperature. The at least one physical or chemical variable characterizing the at least one parameter of the environment is then an electrical resistance or even a time constant. In such case, involved is a widely used approach for temperature determination. Alternatively, an option is to provide at least one capacitor, especially a temperature dependent capacitor, for registering the temperature, wherein the at least one physical or chemical variable characterizing the at least one parameter of the environment is the time constant of the at least one capacitor. This second variant is especially advantageous, since the ascertaining of the temperature is performed, in this case, via the time constant of the charging- and/or discharging electrical current. This permits, on the one hand, a more exact determining of the temperature. On the other hand, the registering of the temperature in the form a time constant enables a digital transmission of the compensation variable to the primary electronics unit. Besides the temperature, a capacitor in the compensation branch permits, moreover, also other environmental parameters to be compensated, such as, for example, the humidity.

In an additional, especially preferred embodiment, the environmental parameter to be compensated is the expansion of the wall of the measuring tube or pipe of a flow measuring device, through which a fluid flows under pressure. In such case, it is, in turn, advantageous to provide at least two strain gages, especially in the form of strain dependent resistors, for measuring the expansion of the wall.

Independently of which variable is provided as compensation variable, it is advantageous that the communication between the primary sensor unit and primary electronics unit in the measurement branch and the communication between the secondary sensor unit and secondary electronics unit in the compensation branch occur equivalently. Especially, no supplemental electronics or additional electronic components are needed within the primary electronics unit. For example, there can be produced by means of the compensation branch a compensation signal, which is transmitted in a time window, in which no measurement signals or also excitation signals are transmitted between the primary sensor unit and primary electronics unit. The compensation signal is transmitted in the time window to the measurement branch, where it can be evaluated based on the electronic components present in any event within the primary electronics unit. It is, furthermore, especially advantageous that the measurement signal and/or compensation signal, in each case, be in the form of a time, time constant, and/or frequency.

In a preferred embodiment, the primary and secondary electronics units are each equipped with a unit for bidirectional communication. Thus, not only the compensation variable can be transmitted to the primary electronics unit, but, instead, conversely, also parameters, for example, of the measuring or of the sensor, can be transmitted from the primary to the secondary electronics unit, thus in the reverse direction, and electronically stored there. In given cases, the equipping of the apparatus with means for bidirectional communication requires the provision of additional electronic components. Alternatively, also, at the algorithmic level, certain codes can be agreed on, which include, for example, the introduction of certain time windows, in which no signal transmission between the primary sensor unit and primary electronics unit takes place. Within these time windows, then the secondary electronics unit can transmit the compensation signal to the measurement branch.

Advantageously, the primary and secondary electronics units are so embodied that a digital transmission of the compensation signal and of a primary measurement signal generated in the measurement branch and related to the process variable is possible. The digital transmission can, in such case, be done both in a time interval as well as also in a frequency band.

Furthermore, it is advantageous, when the compensation branch is so embodied that it has a disturbing influence on the measurement branch of less than 1%, especially less than 0.05%, especially less than 10 ppm. These figures refer, in such case, in each case, to the amplitude of the measurement signal.

In an additional preferred embodiment, the compensation branch is so embodied that a plurality of parameters of the environment are simultaneously compensatable and/or measurable. For example, both the influence of temperature as well as also the influence of the expansion of the tube wall can be simultaneously registered and eliminated.

Furthermore, it is advantageous that the electrical connection between the primary sensor unit and the primary electronics unit be composed of at least two conductors. Transmission of the compensation signal to the measurement branch is accomplished by application of exactly two conductors directly via the electrical lines between the primary sensor unit and primary electronics unit. Since, in the case of this embodiment, thus no additional lines are necessary, this is an especially cost efficient solution.

In a preferred embodiment, the process variable is the flow of a fluid flowing through a measuring tube or pipe or the fill level of a medium in a container.

In an additional preferred embodiment, the primary sensor unit is a sensor unit of an ultrasonic, flow measuring device.

The object of the invention is achieved, furthermore, by a method for monitoring a physical or chemical process variable by means of an apparatus having at least one measurement branch and a compensation branch connected in parallel therewith for compensating the influence of at least one parameter of the environment on the process variable, wherein the process variable is ascertained in the measurement branch, wherein a physical or chemical variable characterizing at least one environmental parameter is ascertained in the compensation branch, wherein the energy required for measuring the parameter of the environment is drawn from the measurement branch, and wherein from the characteristic physical or chemical variable a compensation signal is ascertained, which is transmitted to the electronics unit of the measuring branch.

In summary, an apparatus of the invention and/or the application of the method of the invention permits the registering of a physical or chemical process variable free of the influence of at least one environmental parameter. This environmental parameter can especially be the temperature or the humidity or even the expansion of a measuring tube or pipe as reaction to a fluid flowing under pressure through a pipeline. In contrast to other measures from the state of the art for eliminating and/or compensating the at least one parameter of the environment, the compensation of the invention occurs locally. Thus, it is achieved that the determining of the process variable and the compensation variable do not influence one another. Advantageously, an adaptive communication can be enabled. Moreover, the measurement branch and compensation branch are energetically decoupled from one another. The decoupling concerns, in such case, the producing of the compensation signal. The secondary electronics unit draws the required energy from the measurement branch, supplies the secondary sensor unit, and processes the characteristic physical or chemical variable registered by means of the secondary sensor unit. Finally, a further advantage lies in the fact that for conditioning the measurement signal by means of the compensation signal no additional special components designed for such purpose are necessary within the secondary electronics unit. The conditioning can occur on a software plane.

Of course, the present invention is not limited to the here mentioned examples of parameters of the environment. Likewise, it is recognized that besides the here mentioned measuring methods for registering the temperature or the expansion of a tube, or pipe, wall, also other options are known, which likewise can be applied and fall within the scope of the present invention.

BRIEF DESCRIPTION OF THE DRAWINGS

The invention as well as some advantageous examples of embodiments will now be described in greater detail by means of the drawing, the figures of which show as follows:

FIG. 6 is a block diagram of a compensation circuit of the invention for compensating the influence of temperature and the expansion of a tube, or pipe, wall.

DETAILED DISCUSSION IN CONJUNCTION WITH THE DRAWINGS

Figure 7:
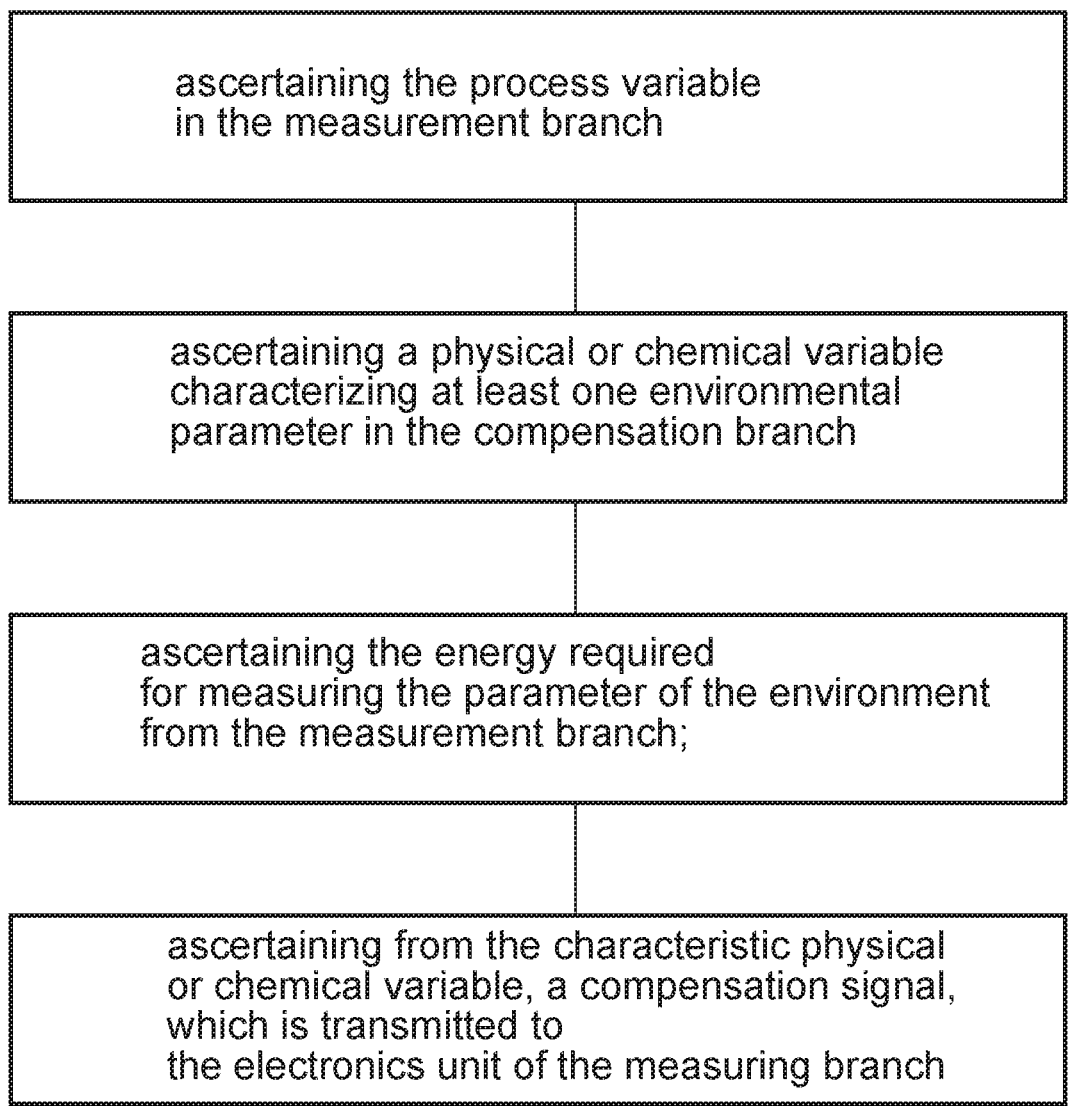
FIG. 7 shows a flow chart of method steps of the invention.

FIG. 7 shows a flow chart of method steps of the invention.

Figure 1:
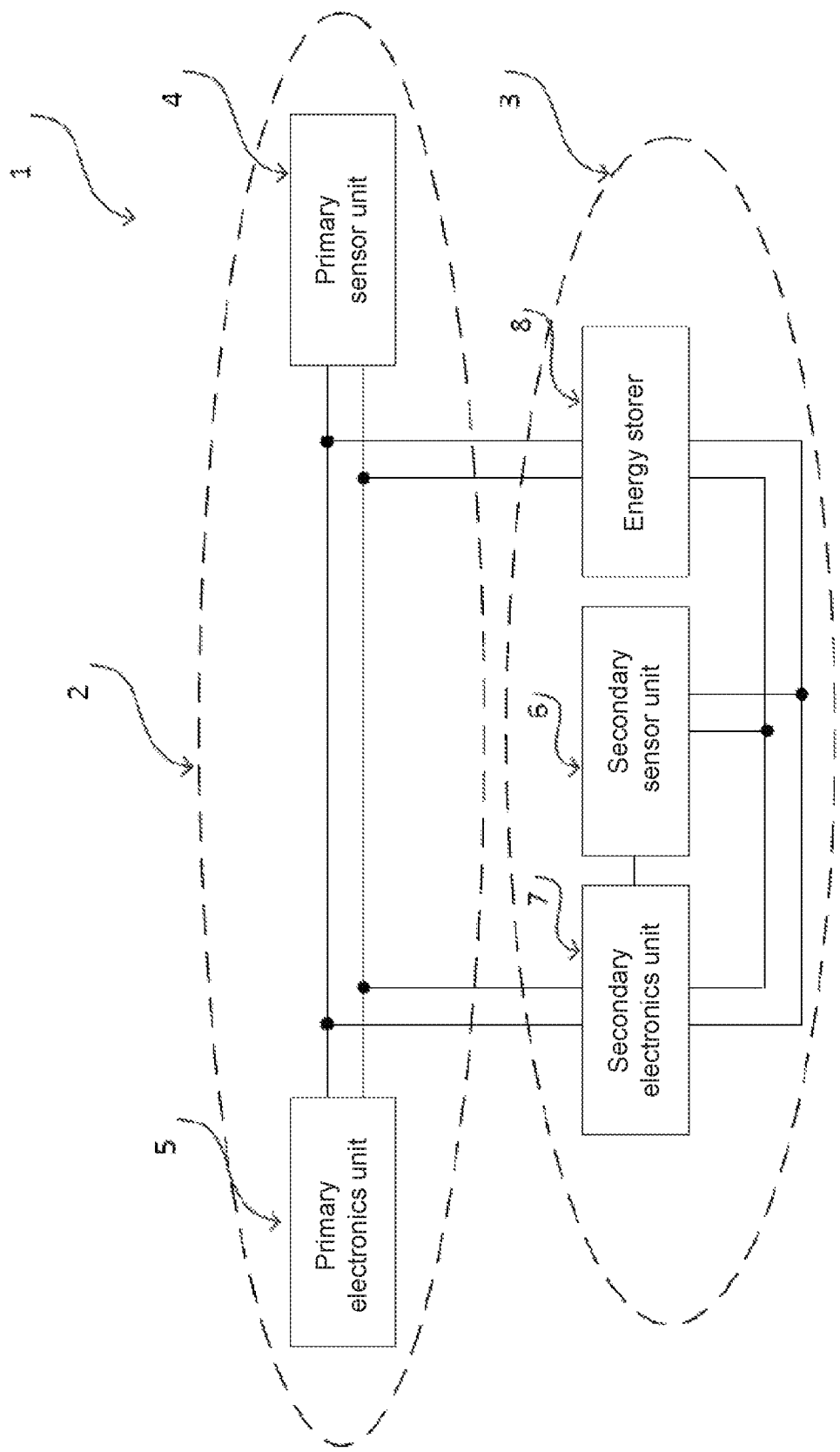
FIG. 1 is a block diagram of an apparatus of the invention.

FIG. 1 shows a block diagram of an apparatus 1 of the invention corresponding to the features of claim 1 and having a measurement branch 2 and a compensation branch 3 for compensating the influence of at least one parameter of the environment. The measurement branch 2 includes a primary sensor unit 4 and a primary electronics unit 5. The compensation branch 3 is connected in parallel and includes, in turn, a secondary sensor unit 6 and a secondary electronics unit 7. Since the secondary electronics unit 7 draws the energy required for determining the compensation variable from the measurement branch 2, integrated in this embodiment is, furthermore, an energy storer 8. This is, however, not absolutely necessary. Furthermore, the reference branch 3 embodied according to FIG. 1, which is equipped with two connecting lines for energy supply and data transmission, can also be implemented by means of a single connecting line in the case that there is integrated within the reference branch 3, for example, a module for energy production (not shown), such as, for example, a solar module.

If the apparatus 1 is to be designed in such a manner that more than one environmental parameter is to be compensated, the generated compensation signal in the compensation branch 3 can have a number of features.

For purposes of simplification, all of the following explanations use the example of an ultrasonic, flow measuring device with a compensation circuit. Of course, other field devices fall within the scope of the present invention. Ultrasonic, flow measuring devices are applied widely in process and automation technology. They permit, in simple manner, determination of volume flow and/or mass flow in a pipeline. Corresponding field devices are produced by the applicant in a wide variety of forms and are sold, for example, under the designations, Prosonic DDU10 and Prosonic Proline P. In the case of the travel-time difference principle, the different travel times of ultrasonic pulses in, and counter to, the flow direction of the medium are evaluated, while in the case of the Doppler principle an ultrasonic pulse of adjustable frequency is coupled into the medium and the reflected signal detected.

The ultrasonic waves are usually produced and received by means of at least one ultrasonic transducer, usually two, which are placed either in the tube wall, such as in the case of inline devices, or pressed externally on the tube, or pipe, wall, such as in the case of clamp-on devices. An ultrasonic transducer includes, in such case, usually an electromechanical transducer unit, such as, for example, a piezoelectric element, and a coupling layer. In the electromechanical transducer unit, the ultrasonic wave is produced as an acoustic signal and via the coupling layer coupled either directly into the fluid or in the case of clamp-on devices intermediately through the wall of the pipeline and then into the fluid.

Figure 2:
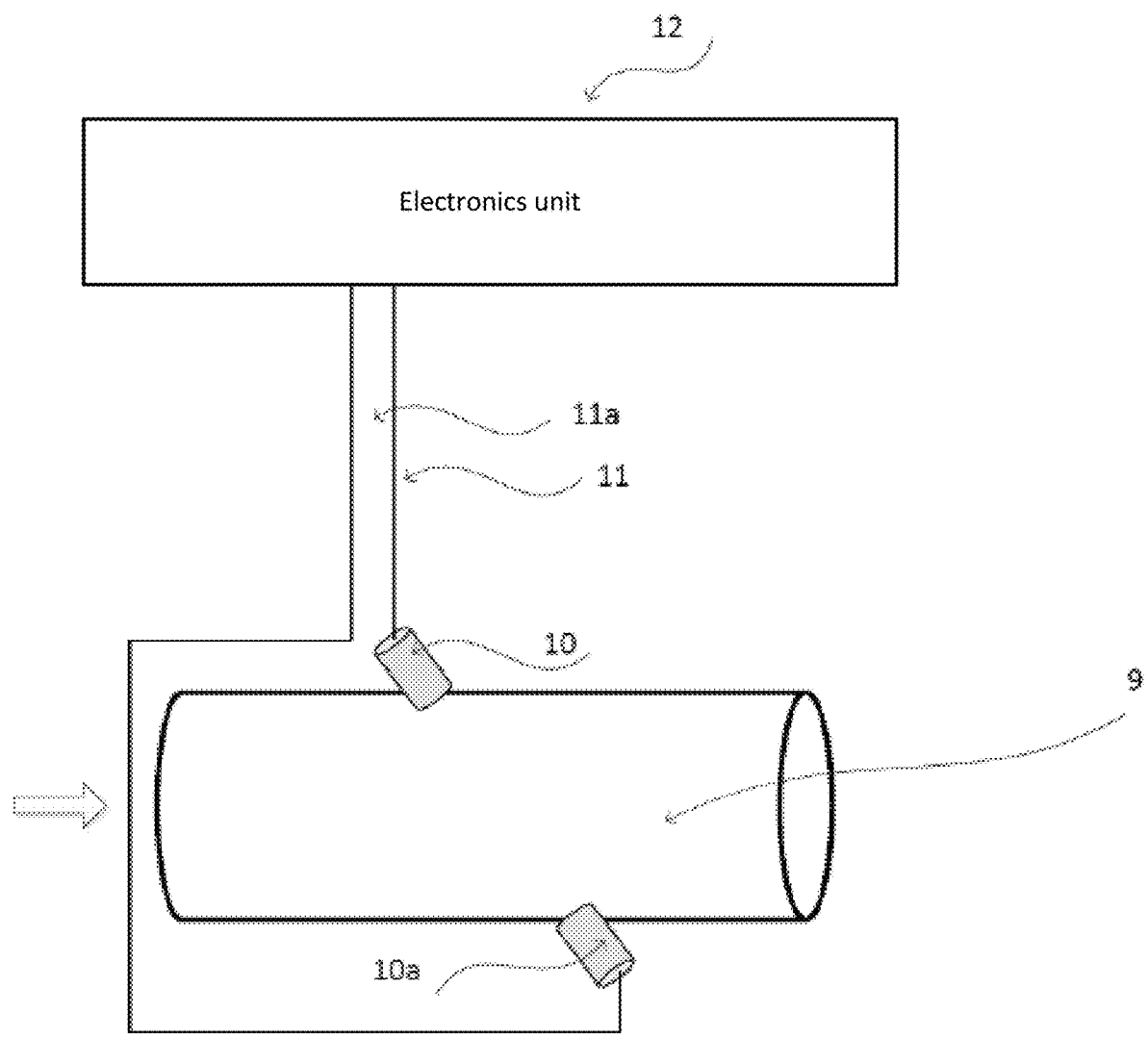
FIG. 2 is a schematic view of an ultrasonic, flow measuring device of the state of the art.

A schematic view of an ultrasonic, flow measuring device of the state of the art is shown in FIG. 2. Shown is the measuring tube 9 flowed through by a flowing fluid (flow direction indicated by the arrow). Arranged on or into the wall of the measuring tube 9 are two ultrasonic transducers 10,10a aligned along an imaginary connecting line through the measuring tube 9. The ultrasonic transducers 10,10a are connected by means of two connecting cables 11,11a with an electronics unit 12, which serves for signal registration, evaluation, and/or feeding.

For many applications of an ultrasonic, flow measuring device, it is expedient to compensate at least one environmental parameter, such as, for example, the temperature or the expansion of a tube, or pipe, wall under the pressure effect of a medium flowing under pressure, in order to improve the measuring of the flow. This can be done by incorporating a compensation branch of the invention.

For the example of an ultrasonic, flow measurement with compensation of at least one environmental parameter, the two ultrasonic transducers 10,10a are components of the primary sensor unit and the electronics unit 12 is the primary electronics unit 5 of the invention. Connected in parallel with this construction of primary sensor unit 4 and primary electronics unit 5 is the compensation branch 3 of the invention. The energy required for the compensation measurement is drawn from the measurement branch of the invention. Since in ultrasonic flow measurement one usually works with transmitted and received signals in the form of pulse packets, there is the opportunity of transmitting the compensation signal during the transmission pauses of the ultrasonic flow measurement.

The following figures focus, for purposes of simplicity, on the details of the compensation branch 3 in different embodiments. Primed reference characters distinguish, in such case, different examples of embodiments.

Figure 3A:
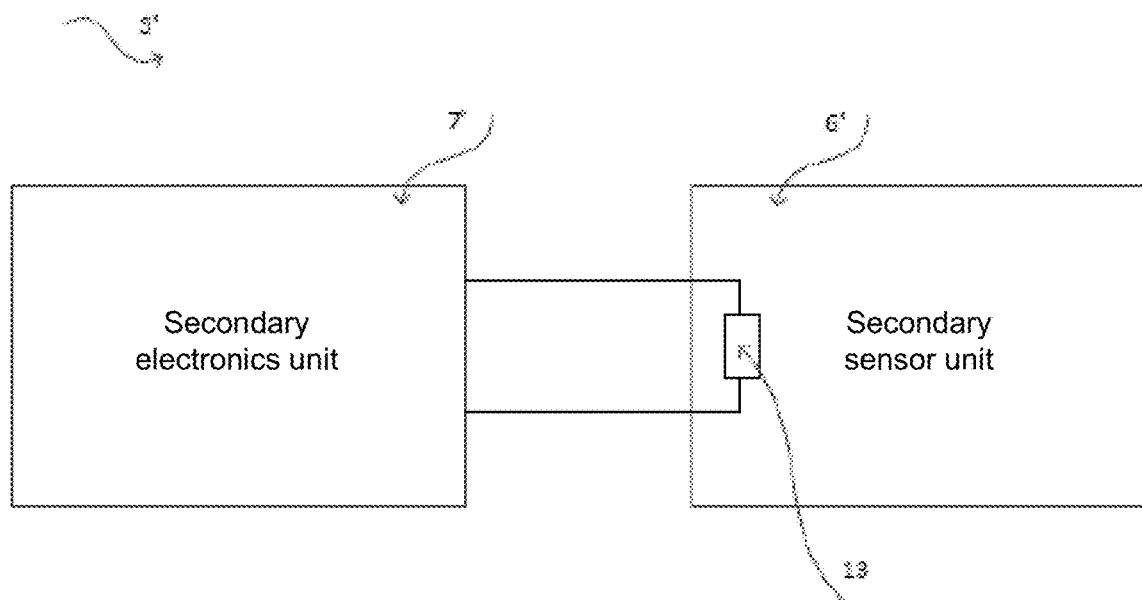
FIG. 3(a) is a block diagram of a compensation circuit of the invention for compensating the influence of temperature by means of a resistance, and (b) the compensation signal as a function of time for compensating temperature by means of a resistance.
Figure 3B:
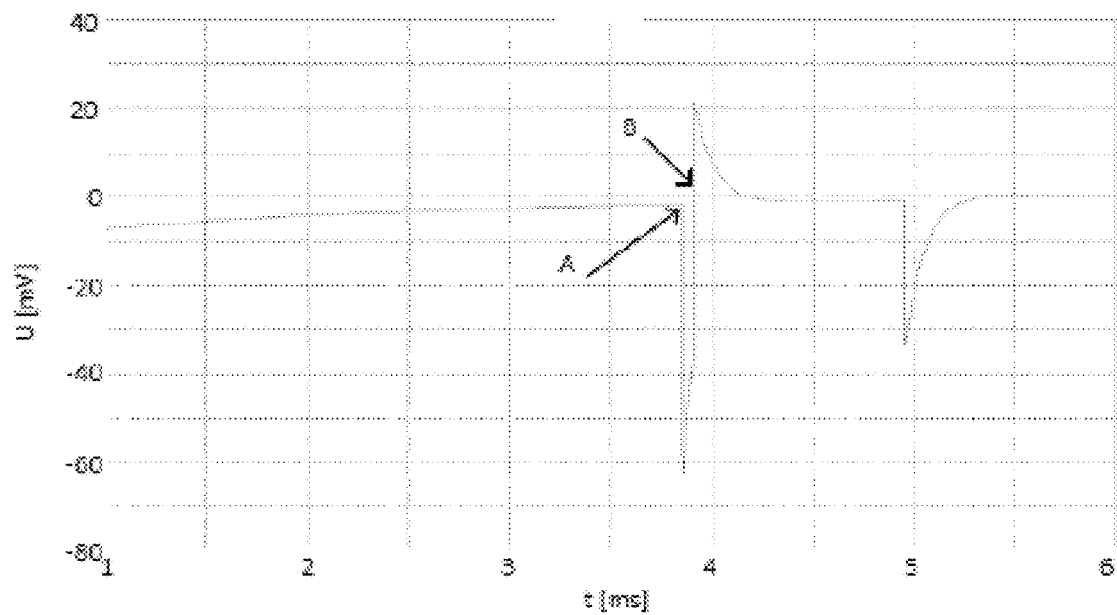

FIG. 3 shows one way of compensating temperature. Shown in FIG. 3a) is a block diagram of a compensation circuit 3' with a secondary electronics unit 7' and a secondary sensor unit 6'. Present within the secondary electronics unit 6' is a temperature dependent resistor 13, which can be, for example, a resistor of the type PT1000. Shown in FIG. 3b) is, finally, a corresponding compensation signal in the form of a voltage pulse as a function of time. Since the temperature dependent resistor 13 determines the separation of the two characteristic points A and B shown in the graph, the temperature can be ascertained from this separation.

Figure 4A:
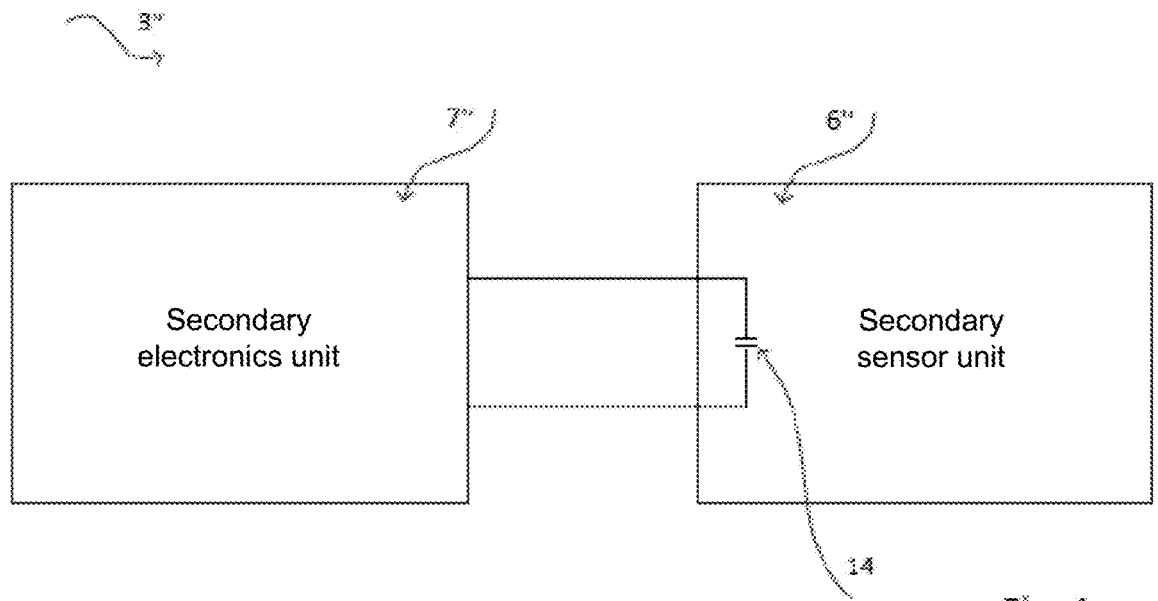
FIG. 4(a) is a block diagram of a compensation circuit of the invention for compensating the influence of temperature by means of a capacitor, and (b) the compensation signal as a function of time for compensating temperature by means of a capacitor.

Alternatively, the temperature can be compensated by means of a compensation circuit with a capacitor. This is shown in FIG. 4. Here also, FIG. 4a) is a block diagram of a compensation circuit 3" with a secondary electronics unit 7" and a secondary sensor unit 6", wherein the secondary sensor unit 6" contains, in this case, a temperature dependent capacitor 14.

Figure 4B:
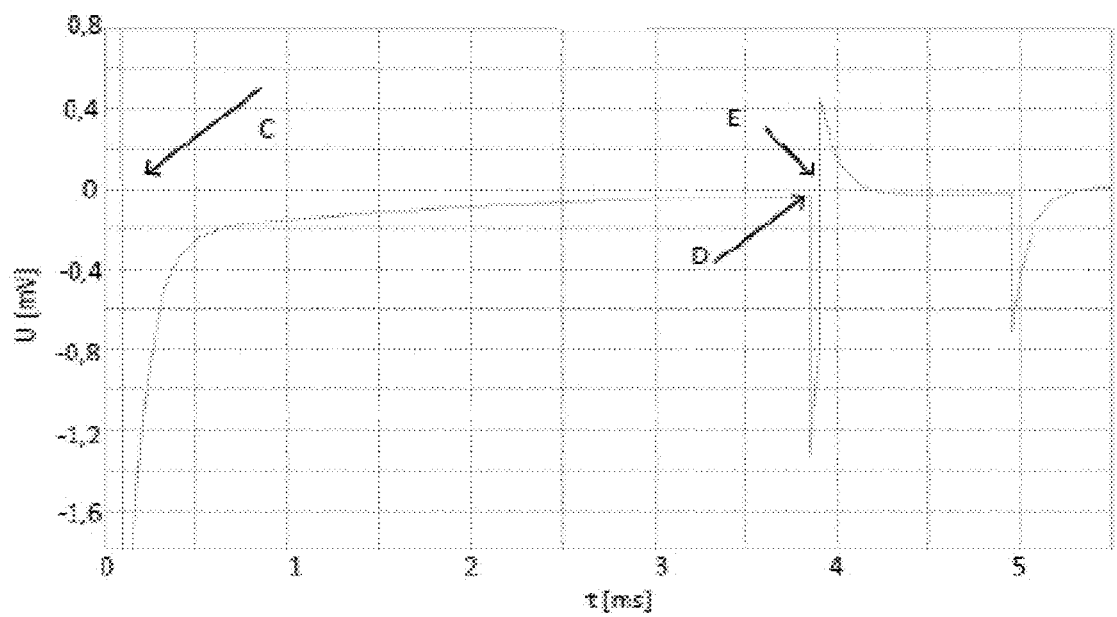

Again, in FIG. 4b), the corresponding compensation signal is shown in the form of a voltage pulse as a function of time. In such case, the separations between the characteristic points C and D, and D and E, are, in each case, determined by the temperature dependent capacitor.

Besides the application for compensation of temperature, a temperature dependent capacitor 14 can also serve for measuring humidity.

Figure 5A:
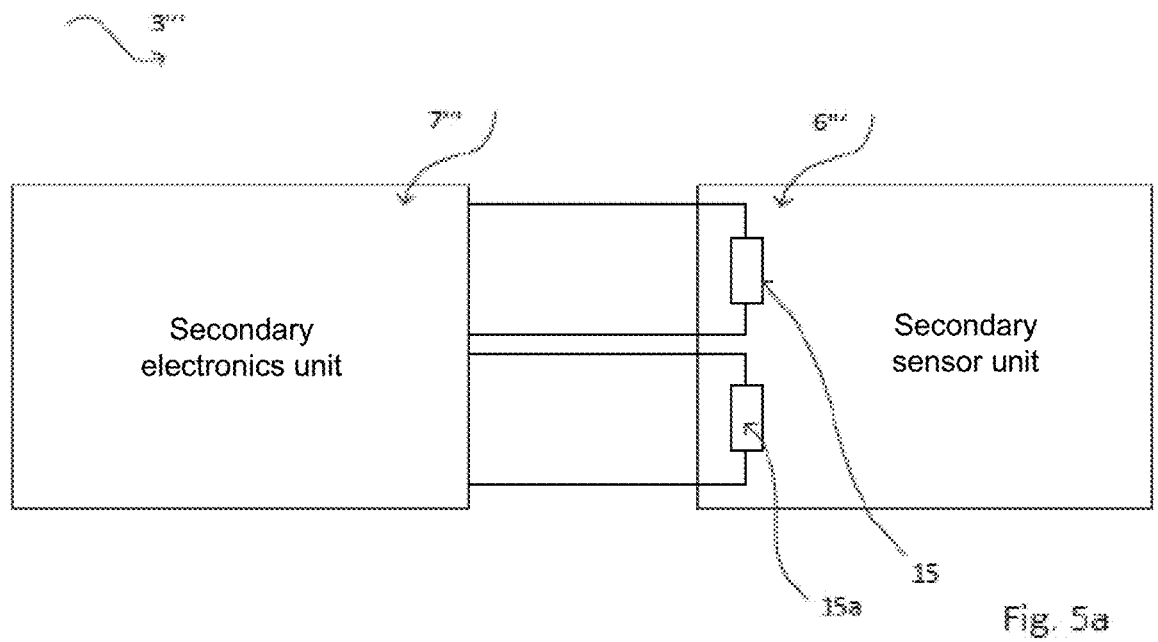
FIG. 5(a) is a block diagram of a compensation circuit of the invention for compensating the influence of expansion a tube, or pipe, wall by means of two strain gages, and (b) the compensation signal as a function of time for compensating the expansion of a tube, or pipe, wall by means of two strain dependent resistors.
Figure 5B:
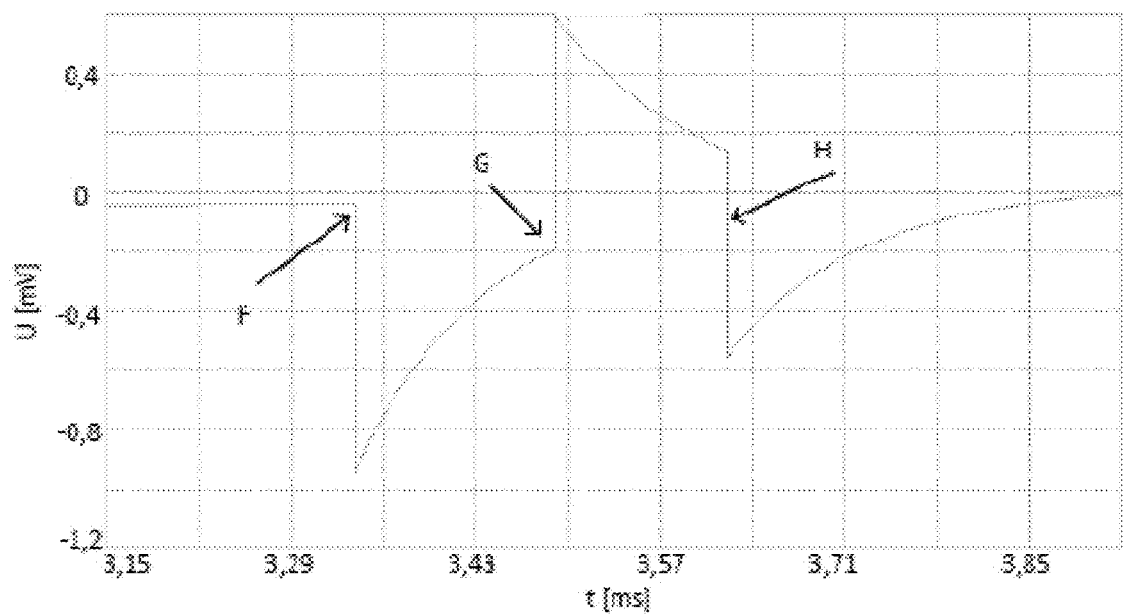

If, instead of the temperature, the expansion of a pipeline as reaction to a fluid flowing under pressure through the pipeline is to be compensated, a construction as shown in FIG. 5 is suitable. From the block diagram in FIG. 5a), it is evident that, in this case, provided within the secondary sensor unit 6''' are two strain gages in the form of two strain dependent resistors 15, 15a. The associated compensation signal is shown in FIG. 5b). The expansion of the pipeline is determined from the ratio of the two resistances 15,15a, thus from the separations between the characteristic points F and G, G and H as well as F and H.

However, also two different environmental parameters can be compensated simultaneously, such as shown, by way of example, in FIG. 6. The secondary sensor unit 6'''' in this last example of an embodiment serves for the simultaneous compensation of temperature by means of a temperature dependent resistance 13' as well as for the compensation of the expansion of the tube, or pipe, wall by means of two strain dependent resistances 15',15a'. With reference to the graph of FIG. 5b), the expansion of the tube, or pipe, wall can be determined analogously from the distances between the characteristic points F and G, G and H as well as F and H, while the temperature results from the distance of the last burst to the characteristic point F.

The invention claimed is:

1. An apparatus for monitoring at least one physical or chemical process variable, comprising:
   at least one measurement branch; and
   a compensation branch connected in parallel therewith for compensating the influence of at least one environmental parameter on the process variable and/or on the measuring of the process variable,
wherein:
   said measurement branch includes at least one primary sensor unit and a primary electronics unit for signal registration, evaluation, and/or feeding;
   said compensation branch includes at least a secondary sensor unit and a secondary electronics unit;
   said secondary sensor unit is so embodied that it registers a physical or chemical variable characteristic for the at least one parameter of the environment;
   said secondary electronics unit is so embodied that it draws the required energy from said at least one measurement branch, and that it produces from the characteristic physical or chemical variable a compensation signal, which it transmits to said primary electronics unit of said measuring branch.

2. The apparatus as claimed in claim 1, wherein:
said primary sensor unit is supplied with a clocked signal; and
said secondary electronics unit is so embodied that it transmits the compensation signal to said primary electronics unit during transmission pauses or receipt pauses.

3. The apparatus as claimed in claim 1, wherein:
said primary electronics unit and said secondary electronics unit are each equipped with a radio module or optical transmission module; and
the compensation signal is transmitted to said primary electronics unit by means of the radio module or optical transmission module.

4. The apparatus as claimed in claim 1, wherein:
the parameter of the environment to be compensated is the temperature.

5. The apparatus as claimed in claim 1, wherein:
the environmental parameter to be compensated is the expansion of a wall of the measuring tube or pipe of a flow measuring device, through which a fluid flows under pressure.

6. The apparatus as claimed in claim 1, wherein:
communication between said primary sensor unit and said primary electronics unit in the measurement branch and communication between said secondary sensor unit and said secondary electronics unit in said compensation branch occur equivalently.

7. The apparatus as claimed in claim 1, wherein:
the measurement signal and compensation signal are each in the form of a time, time constant, and/or frequency.

8. The apparatus as claimed in claim 1, wherein:
said primary and said secondary electronics units are each equipped with a unit for bidirectional communication.

9. The apparatus as claimed in claim 1, wherein:
said primary and said secondary electronics units are so embodied that a digital transmission of the compensation signal and of a primary measurement signal generated in the measurement branch and related to the process variable is possible.

10. The apparatus as claimed in claim 1, wherein:
said compensation branch is so embodied that it has a disturbing influence on said measurement branch of less than 1%, especially less than 0.05%, especially less than 10 ppm.

11. The apparatus as claimed in claim 1, wherein:
said compensation branch is so embodied that a plurality of parameters of the environment are simultaneously compensatable and/or measurable.

12. The apparatus as claimed in claim 1, wherein:
the electrical connection between said primary sensor unit and said primary electronics unit is composed of at least two conductors.

13. The apparatus as claimed in claim 1, wherein:
the process variable is the flow of a fluid flowing through a measuring tube or pipe or the fill level of a medium in a container.

14. The apparatus as claimed in claim 1, wherein:
said primary sensor unit is a sensor unit of an ultrasonic, flow measuring device.

15. The apparatus as claimed in claim 4, further comprising:
a resistor for registering the temperature.

16. The apparatus as claimed in claim 4, further comprising:
at least one capacitor for registering the temperature; and
the physical or chemical variable characteristic of the at least one parameter of the environment is the time constant of said at least one capacitor.

17. The apparatus as claimed in claim 5, further comprising:
at least two strain gages, especially in the form of two strain dependent resistors for measuring the expansion of said wall.

18. A method for monitoring a physical or chemical process variable by means of an apparatus having at least one measurement branch and a compensation branch connected in parallel therewith for compensating the influence of at least one environmental parameter on the process variable, comprising the steps of:
ascertaining the process variable in the measurement branch,
ascertaining a physical or chemical variable characterizing at least one environmental parameter in the compensation branch;
ascertaining the energy required for measuring the parameter of the environment from the measurement branch; and
ascertaining from the characteristic physical or chemical variable, a compensation signal, which is transmitted to the electronics unit of the measuring branch.

* * * * *